United States Patent
Cordier et al.

(10) Patent No.: US 7,580,550 B2
(45) Date of Patent: Aug. 25, 2009

(54) FINGERPRINT-IMAGE-FORMING OPTICAL DEVICE

(75) Inventors: Chantal Cordier, Le Kremlin Bicêtre (FR); Miguel Boutonne, Fontenay le Vicomte (FR); François Riguet, Loudun (FR)

(73) Assignee: Sagem Defense Securite, Paris (FR)

( * ) Notice: Subject to any disclaimer, the term of this patent is extended or adjusted under 35 U.S.C. 154(b) by 452 days.

(21) Appl. No.: 10/574,456

(22) PCT Filed: Oct. 13, 2004

(86) PCT No.: PCT/FR2004/002609

§ 371 (c)(1),
(2), (4) Date: Apr. 4, 2006

(87) PCT Pub. No.: WO2005/038698

PCT Pub. Date: Apr. 28, 2005

(65) Prior Publication Data

US 2007/0014524 A1 Jan. 18, 2007

(30) Foreign Application Priority Data

Oct. 17, 2003 (FR) ................................. 03 12158

(51) Int. Cl.
*G02B 6/04* (2006.01)
(52) U.S. Cl. .................... 382/115; 385/116; 385/120
(58) Field of Classification Search ............. 382/115, 382/116, 120, 124, 126, 127; 385/116, 120; 250/382, 345, 208.1, 216
See application file for complete search history.

(56) References Cited

U.S. PATENT DOCUMENTS

| | | | | |
|---|---|---|---|---|
| 5,077,803 A | * | 12/1991 | Kato et al. | 382/124 |
| 5,761,330 A | * | 6/1998 | Stoianov et al. | 382/127 |
| 6,255,641 B1 | * | 7/2001 | Johnson | 250/208.1 |
| 6,324,020 B1 | * | 11/2001 | Teng et al. | 359/726 |
| 6,956,608 B1 | * | 10/2005 | Shapiro et al. | 348/335 |

FOREIGN PATENT DOCUMENTS

| | | |
|---|---|---|
| EP | 0 348 182 A | 12/1989 |
| WO | WO 01/88835 A | 11/2001 |

OTHER PUBLICATIONS

Hebert R.T., "Off-Axis Optical Elements in Integrated, Injection-Molded Assemblies," Proceedings of the SPIE, vol. 2600, pp. 129-134, (Oct. 1995).

International Search Report PCT/FR2004/002609; report dated Mar. 29, 2005.

* cited by examiner

*Primary Examiner*—Samir A. Ahmed
*Assistant Examiner*—Stephen R Koziol
(74) *Attorney, Agent, or Firm*—Miller Matthias & Hull

(57) ABSTRACT

The invention relates to an optical device which is used to form a fingerprint image. The inventive device comprises an optical plate having a first main face on which a finger is placed, a first side face comprising a converging mirror, and a second side face which is disposed opposite the first side face and which forms an output face, a focusing lens being disposed opposite said output face. According to the invention, the first main face forms an angle greater than 90° with output face, such that: the incidence of light rays on the first main face, inside the optical plate, is increased; the stray radiation at the output face is reduced; and a thinner plate can be used.

5 Claims, 1 Drawing Sheet

FINGERPRINT-IMAGE-FORMING OPTICAL DEVICE

The present invention generally relates to the field of fingerprinting and it relates, more particularly, to improvements made to optical devices for forming an image of fingerprints.

It is explicitly stressed here that the invention is exclusively concerned with an optical device able to form an image of fingerprints, and that it does not relate to the hardware, situated downstream of said device, for scanning/recording the image obtained, detecting the characteristic points of the fingerprints and providing information on the person concerned.

Various embodiments of optical imaging devices intended for forming an image of fingerprints are already known.

In particular document WO 01/88835 discloses a device for imaging fingerprints comprising:
an optical plate with:
    a first main face constituting a face for affixing a finger of which an image of the fingerprints is to be obtained,
    a first lateral face shaped as a convergent mirror, and
    a second lateral face, opposite the first lateral face and forming the exit face of the optical plate,
at least one light source for illuminating said first main face through the optical plate,
a focusing objective, situated opposite said exit face of the optical plate and having its object focal point situated substantially in the focal plane of the convergent mirror, and
a diaphragm provided with an aperture, said diaphragm being interposed between said exit face and said focusing objective and situated substantially in vicinity to the focusing objective.

This known optical device turns out to be beneficial in principle by virtue of the small number of optical components involved and of their relative ease of manufacture and of assembly. However, this device exhibits an appreciable drawback due to the significance of the stray light which accompanies the image of the fingerprints and which affects the quality of this image. A noticeable reduction in this stray light may be obtained by increasing the thickness of the optical plate.

The devices for detecting fingerprints may, in particular, be used to authenticate a person so that the latter is authorized to perform a determined operation: in this case, the device for detecting fingerprints often is operationally associated with another apparatus that the authenticated person will be authorized to use (computer, banking machine, etc). The room available for installing the device for detecting fingerprints is then reduced, and a fortiori the optical imaging device incorporated into this device for detecting fingerprints must be embodied in the most compact possible form, and especially with the smallest possible thickness (or height). To fix matters, it is required, at least for certain applications, that the optical imaging device exhibit a thickness (or height) not exceeding around 5 mm.

Therefore, the imaging device described in document WO 01/88835 is not satisfactory for meeting the requirements of very small thickness, going hand in hand with good quality of the image obtained of the fingerprints, required to equip devices for detecting fingerprints.

The aim of the present invention is to refine aforesaid known imaging device in such a way as to appreciably reduce the stray light accompanying the image obtained of the fingerprints while contriving matters in such a way that the imaging device exhibits the very small thickness required for the application envisaged and not exceeding around 5 mm.

For these purposes, an optical device for forming an image of fingerprints such as set forth hereinabove is characterized, being arranged in accordance with the invention, in that said first main face of the optical plate forms, with the exit face of this optical plate, an angle of greater than 90°, whereby the angle of incidence of the light rays on said first main face, inside the optical plate, is increased and the stray radiation arriving at the exit face is decreased, at the same time as the thickness of the optical plate can be reduced.

Advantageously moreover, the plane defined by said first main face intersects the diaphragm under the aperture of the latter, whereby a major part of the stray light transmitted from the exit face is intercepted by the diaphragm under the aperture of the latter. However, the inclination of the first main face should not be excessive so that it does not result in a substantial increase in the thickness of the optical plate and it is then desirable for the inclination of said first main face to be just sufficient for said plane to intersect the diaphragm in the immediate vicinity of its aperture. Practically, provision may be made for the angle of inclination of said first main face with respect to a plane perpendicular to the exit face to be between 2° and 25°, this angle typically preferably having a value of around 10°.

Although various solutions are conceivable for installing the light source with respect to the optical plate, it is however beneficial, again with the aim of embodying a device which is the least thick possible, to resort to the solution consisting in that, the optical plate possessing third and fourth lateral faces extending respectively between said first and second lateral faces and mutually opposed, said third and fourth lateral faces are inclined towards one another from the first lateral face and in that at least one light source is disposed opposite at least one of the third and fourth lateral faces.

To simplify mass-production of the optical device in accordance with the invention, it is possible to envisage a reduction in the number of components (a number which is already smallish at the outset) and for this purpose to contrive matters such that the optical plate and the focusing objective are constituted in the form of a single piece exhibiting a slot defined by the exit face of the optical plate and the entrance face of the focusing objective, said slot being shaped so as to receive said diaphragm. The integral piece thus constructed may, for example, be manufactured by molding a transparent material of optical quality, in particular an inexpensive synthetic material.

In a preferred embodiment of the device of the invention, provision is made that downstream of the objective there be provided a mirror arranged so as to reflect the luminous radiation substantially perpendicularly to the optical plate. Thus, still retaining the sought-after characteristic of a thickness that is as reduced as possible for the imaging device, the optical beam reflected by the exit mirror can impinge directly on a sensor belonging to the device for processing the image and analyzing the fingerprints which is situated downstream. Stated otherwise, the exit of the optical beam from the imaging device is effected via the second main face opposite the first main face on which the finger is affixed, thereby making it possible to design a globally compact apparatus whose thickness is as small as desired.

The invention will be better understood on reading the detailed description which follows of certain preferred embodiments given solely by way of nonlimiting example. In this description, reference is made to the appended drawing in which.

Figure 1:
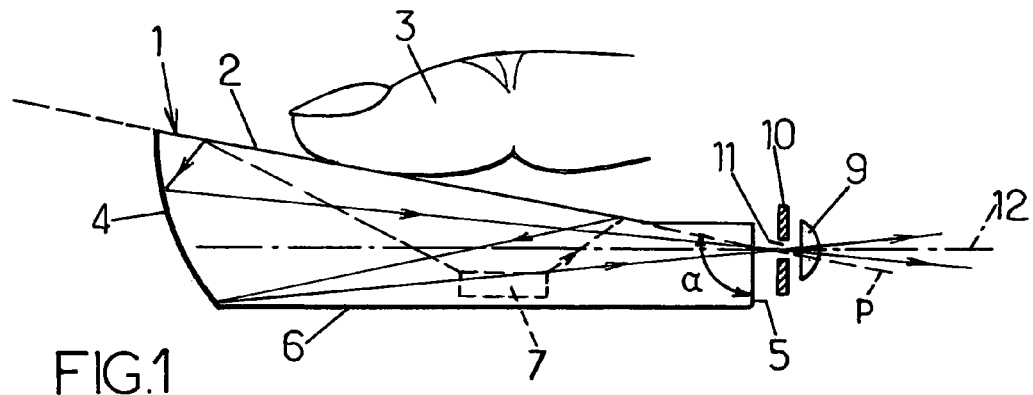
FIG. 1 is an optical diagram illustrating in a side view the construction of an imaging device arranged in accordance with the invention.

Referring firstly to FIG. 1, the imaging device in accordance with the invention comprises an optical plate 1, with:

a first main face 2 constituting a face for affixing a finger 3 of which an image of the fingerprints is to be obtained, a first lateral face 4 shaped as a convergent mirror, and a second lateral face 5, opposite the first lateral face 4 and forming the exit face of the optical plate 1.

The optical plate 1 also possesses a second main face 6, opposite said first main face 2 and that can for example be substantially perpendicular to the exit face 5. Two other lateral faces 8 (not visible in FIG. 1), which will be dealt with later, extend respectively between the two said first and second lateral faces 4, 5.

Figure 2:
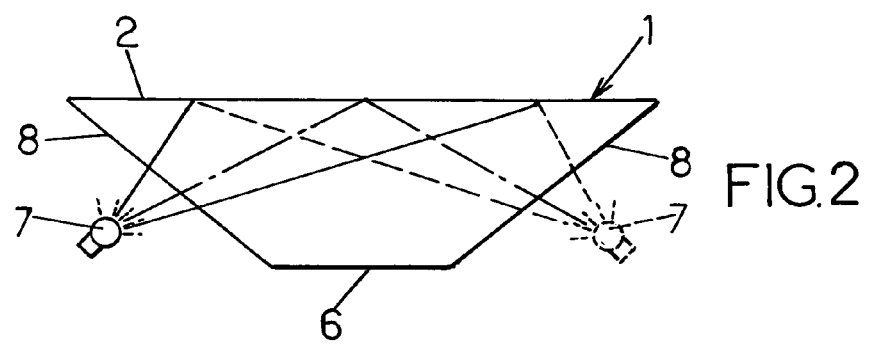
FIG. 2 is a diagram illustrating in an end-on view a preferred arrangement of the imaging device of FIG. 1.

The imaging device furthermore comprises at least one light source 7 for illuminating said first main face 2 through the optical plate 1. The light source could be disposed under the optical plate 1, opposite the second main face 6 of the latter; however, such an arrangement would lead to an increase in the thickness of the imaging device. It turns out to be more judicious, thus, to dispose the light source laterally to the optical plate 1 and to provide at least one light source 7 opposite at least one of the two said other lateral faces 8 of the plate 1. Preferably, as illustrated in FIG. 2, more uniform illumination of the first main face 2 and of the finger 3 which is affixed thereto is obtained by making provision for two light sources 7 to be disposed opposite respectively the two other lateral faces 8 and for the two lateral faces 8 to be inclined towards one another from the first, main face 2, this inclination being as large as possible so that the light arrives at the face 2 with the smallest possible angle of incidence.

The imaging device furthermore comprises a focusing objective 9 (for example a convergent lens) disposed opposite the exit face 5 of the optical plate 1. The focusing objective 9 has its object focal point situated substantially in the focal plane of the convergent mirror 4.

Finally, a diaphragm 10 furnished with an aperture 11 is interposed between said exit face 5 of the optical plate 1 and of the focusing objective 9, being, situated substantially in vicinity to the focusing objective 9.

The axis 12 of the beam reflected by the convergent mirror 4 is substantially perpendicular to the exit face 5, and the aperture 11 of the diaphragm 10 and the focusing objective 9 are disposed coaxially with said axis 12.

According to the invention, the first main face 2 of the optical plate 1 forms, with the exit face 5, an angle α of greater than 90° in such a way that the angle of incidence of the light rays emitted by the source or sources 7 on this main face 2 is increased and closer to the normal, this leading to a reduction in the stray radiation (scattered light) arriving at the exit face 5. This results in the thickness of the optical plate being reducible with respect to the thickness of a prior optical plate for the same amount of stray radiation.

To further reduce the stray radiation arriving at the focusing objective 9, provision is made for the plane P defined by the first main face 2 to intersect the diaphragm 10 outside the aperture 11 of the latter, and more precisely, given the relative positions of the face 2 and of the diaphragm 10, for the plane P to intersect the diaphragm 10 under the aperture 11. However, too significant an inclination of the face 2 would not allow the optical plate to be given as small a thickness as desired: it is therefore necessary to limit the inclination of the face 2 to a value just sufficient for aforesaid plane P to intersect the diaphragm 10 for sure under the aperture 11 of the latter, but in the immediate vicinity of said aperture. In practice, said angle α is between 2° and 25°, and in a typical exemplary embodiment it is around 10°.

Figure 3:
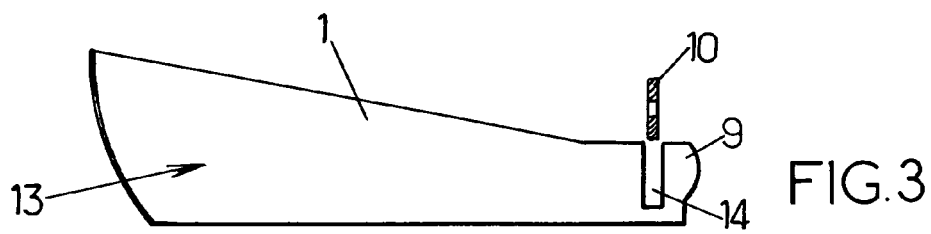
FIG. 3 is a side view of a preferred embodiment of the imaging device of FIG. 1.

The very small number of optical components of the imaging device in accordance with the invention makes it possible to envisage, within the framework of mass production, that the optical plate 1 and the focusing objective 9 be joined in the form of a single, integral piece 13 as illustrated in FIG. 3, said piece 13 exhibiting a slot 14 defined by the opposing faces of the optical plate 1 and of the focusing objective 9, said slot 14 being shaped to receive the diaphragm 10. The piece 13 may be manufactured by molding from a transparent material of optical quality, in particular a synthetic material.

Figure 4:
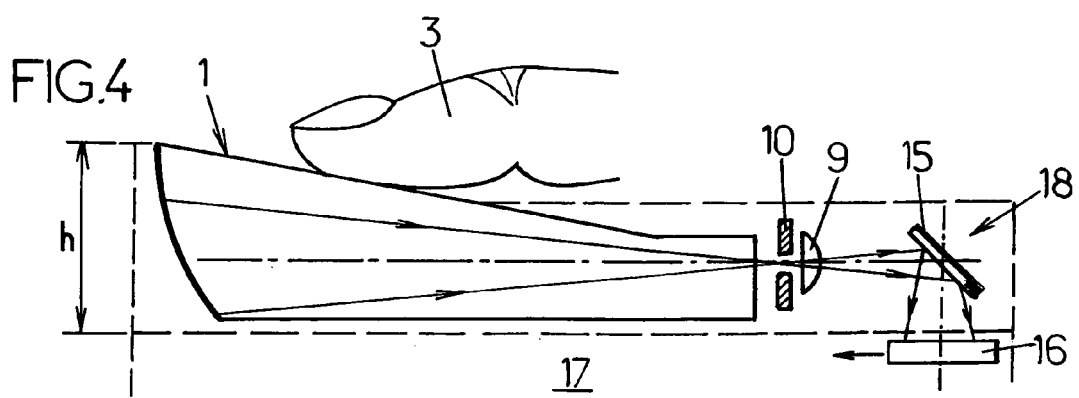
FIG. 4 is a diagram illustrating in a simplified manner a preferred arrangement of the imaging device in accordance with the invention.

In FIG. 4 is illustrated an exemplary installation of the imaging device in accordance with the invention in an apparatus for detecting fingerprints. The imaging device arranged according to the invention (illustrated in its configuration as distinct components according to FIG. 1) is supplemented with a plane mirror 15 disposed following the focusing objective 9 in such a way as to reflect the beam perpendicularly to the optical axis 12, towards a subjacent optical sensor 16 constituting the entrance component of the means 17 suitable for the detection of the image and for the analysis of the fingerprints.

By virtue of the provisions in accordance with the invention, the imaging device, designated as a whole by the reference 18 in FIG. 4, may be arranged with a very small thickness h, of the order of 5 mm, in accordance with the requirements necessary for its installation in the apparatus for detecting fingerprints, at the same time as it is able to deliver a good quality image of the fingerprints.

The invention claimed is:

1. An optical device for forming an image of fingerprints, comprising:

an optical plate with: a first main face constituting a face for affixing a finger of which an image of the fingerprints is to be obtained, a first lateral face arranged as a convergent mirror, and a second lateral face, opposite the first lateral face and forming an exit face of the optical plate which defines an angle greater than 90° with said first main face, at least one light source for illuminating said first main face through the optical plate, a focusing objective located opposite said exit face, said focusing objective having an object focal point situated substantially in a focal plane of said convergent mirror, and a diaphragm provided with an aperture, said diaphragm being interposed between said exit face and said focusing objective and situated substantially in the vicinity to said focusing objective, wherein a plane defined by said first main face defines an angle between 2° and 25° with a plane perpendicular to said exit face and intersects said diaphragm under and in the vicinity to said aperture thereof, whereby the angle of incidence of the light rays on said first main face, inside the optical plate, is increased and the stray light transmitted from said exit face is substantially intercepted by said diaphragm under said aperture thereof, while the thickness of the optical plate can be reduced.

2. The optical device as claimed in claim 1, wherein said angle is around 10°.

3. The optical device as claimed in claim 1 said optical plate having third and fourth lateral faces extending respectively between said first and second lateral faces and mutually opposed, wherein said third and fourth lateral faces are inclined towards one another from the first lateral face and wherein at least one light source is facing at least one of the third and fourth lateral faces.

4. The optical device as claimed in claim 1 wherein said optical plate and said focusing objective are grouped as one single piece having a slot defined by said exit face of said optical plate and said entrance face of said focusing objective, said slot being shaped so as to receive said diaphragm.

5. The optical device as claimed in claim 1 wherein a mirror is located downstream of said focusing objective and is arranged so as to reflect the luminous radiation substantially perpendicularly to said optical plate.

* * * * *